Patented Oct. 3, 1933

1,929,352

UNITED STATES PATENT OFFICE 1,929,352

LAMINATED GLASS

Joseph G. Davidson, Yonkers, N. Y., assignor to Carbide & Carbon Chemicals Corporation, a corporation of New York No Drawing. Application July 28, 1928
Serial No. 296,106

3 Claims. (Cl. 49—92)

The invention relates to laminated structures and particularly to structures of the type known as non-shattering glass.

As is well known, the difficulties encountered in joining articles by means of adhesive cement are as a rule intensified when one or both of the articles to be joined are composed of non-porous material, and when the surfaces to be joined are highly polished. Some non-porous substances which can be highly polished can be cemented without special difficulty because cements are available which appear to react on the substance in such a way as to give some slight degree of inter-penetration, whereby the firmness of the bond between the cement and the article to which it is applied is greatly increased. On the other hand glass, glazed ware, and other vitreous substances, and very hard and stable substances such as natural or artificial gems and abrasives are very difficult to cement, the difficulties encountered and the chemical and physical stability of such substances indicating that little or no inter-penetration occurs with most adhesives.

In the making of non-shattering glass, the adhesive used must of course make a firm bond with the glass, and must be tough enough to restrain the fragments of glass when the sheet is broken. In addition the cement should not become clouded or seriously discolored on exposure to light, and it should preferably be insoluble in water.

I have discovered that excellent adhesives particularly adapted for the cementing of vitreous and other highly polished surfaces, such as are presented by glass sheets, can be prepared by polymerizing vinyl compounds. Such polymerized compounds are proposed in the prior art as substitutes for natural resins in the making of plastics and lacquers, but so far as I am aware it has never been proposed to use them as adhesives. Excellent adhesive products can be prepared from many vinyl compounds including the vinyl esters, and particularly the esters of organic acids, for example, vinyl acetate, formate, propionate or butyrate. Before or during polymerization, the vinyl compound may be mixed with other polymerizable substances, such as aldehydes and olefine oxides. Polymerization may be effected by the methods disclosed in the prior art, for example by using heat or ultra-violet radiation or both, and a catalyst.

In making non-shattering glass the vinyl compound may be applied to the glass, or to a sheet of celluloid, gelatin or other material which is to be cemented to the glass, and polymerized in situ, but I prefer to polymerize the material at least partially before applying it. The pieces to be joined may be pressed together before the adhesive has hardened, or the adhesive may be permitted to harden and subsequently softened by applying heat or a solvent.

I have found that the herein described adhesives are so tough and adherent that it is possible to use them to make non-shattering glass by merely cementing together two or more sheets of glass, omitting the interposed sheet of celluloid which has been generally used in the non-shattering glass heretofore made commercially. In following this procedure the film of adhesive should be thick enough to hold the fragments of glass together when the sheet is broken. A thick film of adhesive may be provided, for example, by fabricating a sheet of the solid vinyl polymerization product and interposing it between two sheets of glass after providing a layer of the softened adhesive on either side of the preformed sheet, as by heating the latter or moistening it with solvent, or by applying additional adhesive to the preformed sheet or the glass.

I claim as my invention:

1. A laminated structure consisting of a plurality of sheets of glass and a layer composed of a polymerization product of an ester of vinyl alcohol disposed between adjacent sheets of glass, the said polymerization product adhering directly to the glass.

2. A laminated structure consisting of a plurality of sheets of glass and a layer composed of a polymerization product of an organic ester of vinyl alcohol disposed between adjacent sheets of glass, the said polymerization product adhering directly to the glass.

3. A laminated structure consisting of a plurality of sheets of glass and a layer composed of a vinyl polymerization product containing vinyl acetate disposed between adjacent sheets of glass, the said polymerization product adhering directly to the glass.

JOSEPH G. DAVIDSON.